(12) United States Patent
Bohn et al.

(10) Patent No.: US 6,588,798 B2
(45) Date of Patent: Jul. 8, 2003

(54) GAS BAG MODULE

(75) Inventors: Stefan Bohn, Goldbach (DE); Joachim Fellhauer, Nilkheim (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 10/060,134

(22) Filed: Jan. 30, 2002

(65) Prior Publication Data

US 2002/0105179 A1 Aug. 8, 2002

(30) Foreign Application Priority Data

Feb. 7, 2001 (DE) .......................... 201 02 107

(51) Int. Cl.[7] .............................................. B60R 21/16
(52) U.S. Cl. ..................... 280/743.1; 280/729; 280/731
(58) Field of Search ................ 280/731, 732, 280/743.1, 743.2, 728.1, 728.2, 728.3, 729

(56) References Cited

U.S. PATENT DOCUMENTS 3,618,979 A * 11/1971 Gulette ........................ 280/731
4,828,286 A * 5/1989 Fohl ............................ 280/731
5,125,682 A * 6/1992 Hensler et al. ............. 280/731
5,190,313 A * 3/1993 Hickling ................... 280/743.1

FOREIGN PATENT DOCUMENTS

| DE | 19904072 A1 | 8/2000 |
| DE | 19932696 C1 | 9/2000 |
| EP | 1172263 A2 | 1/2002 |
| WO | WO9734783 | 9/1997 |

* cited by examiner

Primary Examiner—Eric Culbreth
(74) Attorney, Agent, or Firm—Tarolli, Sundheim, Covell, & Tummino L.L.P.

(57) ABSTRACT

The invention relates to a gas bag module comprising a gas bag including a gas bag wall which has a front and a rear wall section and including at least one chamber. The gas bag further comprises an indentation running from the front wall section in an inflated state in a direction toward the rear wall section. The indentation is formed in that a part of the gas bag wall is prevented from an unimpeded movement towards outside of the module on unfolding of the gas bag. The gas bag, in a region of a mouth of the indentation, has a bubble-like inflatable extension in flow connection with the at least one chamber of the gas bag, which extension closes the indentation.

27 Claims, 3 Drawing Sheets

GAS BAG MODULE

TECHNICAL FIELD

The invention relates to a gas bag module.

BACKGROUND OF THE INVENTION

Known gas bag modules comprise a gas bag with a gas bag wall which has a front and a rear wall section, an indentation running from the front wall section in the inflated state in the direction toward the rear wall section, which indentation is formed in that a part of the gas bag wall is prevented from an unimpeded movement towards outside of the module on unfolding of the gas bag. Such gas bags are intended to be incorporated in the steering wheel or the instrument panel and to protect the occupant in a frontal impact. The gas bag has an annular chamber which is to be inflated, and the inner wall, delimiting the indentation, is formed by the indentation. The indentation extends from the front wall centrally towards the rear, and the lowest point of the indentation is formed by a fabric piece which is permanently fastened to the gas bag module and hence on unfolding is not moved freely towards the occupant, to prevent him from being held back. The gas bag usually emerges obliquely outwards from the module owing to the annular shape of the chamber, and only subsequently does the front wall section move towards the occupant.

BRIEF SUMMARY OF THE INVENTION

With an occupant sitting centrally and with a high impact intensity, it is to be prevented that the occupant's head can plunge into the indentation. This is achieved by constructional approaches that are differingly complicated. The invention provides a simple, cost-effective solution for this.

This is achieved in a gas bag module which comprises a gas bag including at least one chamber as well as including a gas bag wall which has a front and a rear wall section. The gas bag further comprises an indentation running from the front wall section in an inflated state in a direction toward the rear wall section. The indentation is formed in that a part of the gas bag wall is prevented from an unimpeded movement towards outside of the module on unfolding of the gas bag. The gas bag, in a region of a mouth of the indentation, has a bubble-like inflatable extension in flow connection with the at least one chamber of the gas bag, which extension closes the indentation.

According to the preferred embodiment, the gas bag according to the invention has an indentation which at least in sections runs obliquely, which indentation is preferably already closed at its mouth and thus prevents the slightest plunging of the occupant's head into the indentation. The obliquely running wall section makes it possible that, at least in the case of a heavy occupant plunging in the gas bag, the extension is supported by the gas bag wall defining the indentation. If applicable, such supporting is already provided in the fully inflated state of the gas bag, without an occupant acting. The inflatable extension may impart an asymmetric shape to the gas bag, and may compress the mouth laterally from one side and close it.

Preferably, the extension moves on inflation radially towards the mouth, in order to close it and to give the indentation an oblique orientation. The oblique orientation, however, is not necessarily to be created by the extension. The oblique orientation can be achieved by a middle axis of the indentation running obliquely with respect to the middle axis of the gas bag or by a part of the gas bag wall defining the indentation extending at least partially obliquely so that the indentation has not a fully cylindrical shape.

In the inflated state, the extension preferably projects outwards with respect to the front wall section, which is useful for the stability of the gas bag and also gives the extension, which acts like a closure, a greater stability.

The preferred embodiment of the gas bag makes provision that, in relation to the spread-out, non-inflated state of the gas bag, the latter consists of at least four fabric sections lying one over the other and being connected with each other. An upper and a lower fabric piece are provided to form the front and rear wall sections, respectively. In addition, the gas bag has two inner fabric pieces which delimit the indentation. These inner fabric pieces may have an asymmetrical annular shape and a bulge to form the extension. The inner fabric pieces are usually sewn to each other at their outer edges.

In one embodiment, provision can be made in addition that all the fabric pieces have a central opening, with the possibility of arranging the openings so as to be concentrical to each other, again in relation to the spread-out, non-inflated state of the gas bag.

The inner fabric pieces may have an identical external geometry, which facilitates the sewing of the two fabric pieces on the outer edge.

The bulges of the inner fabric pieces preferably have a shape which is similar to a mushroom cap. A ring segment then adjoins the underside of the cap.

DETAILED DESCRIPTION OF THE PREFERRED EMBODIMENTS

Figure 1:
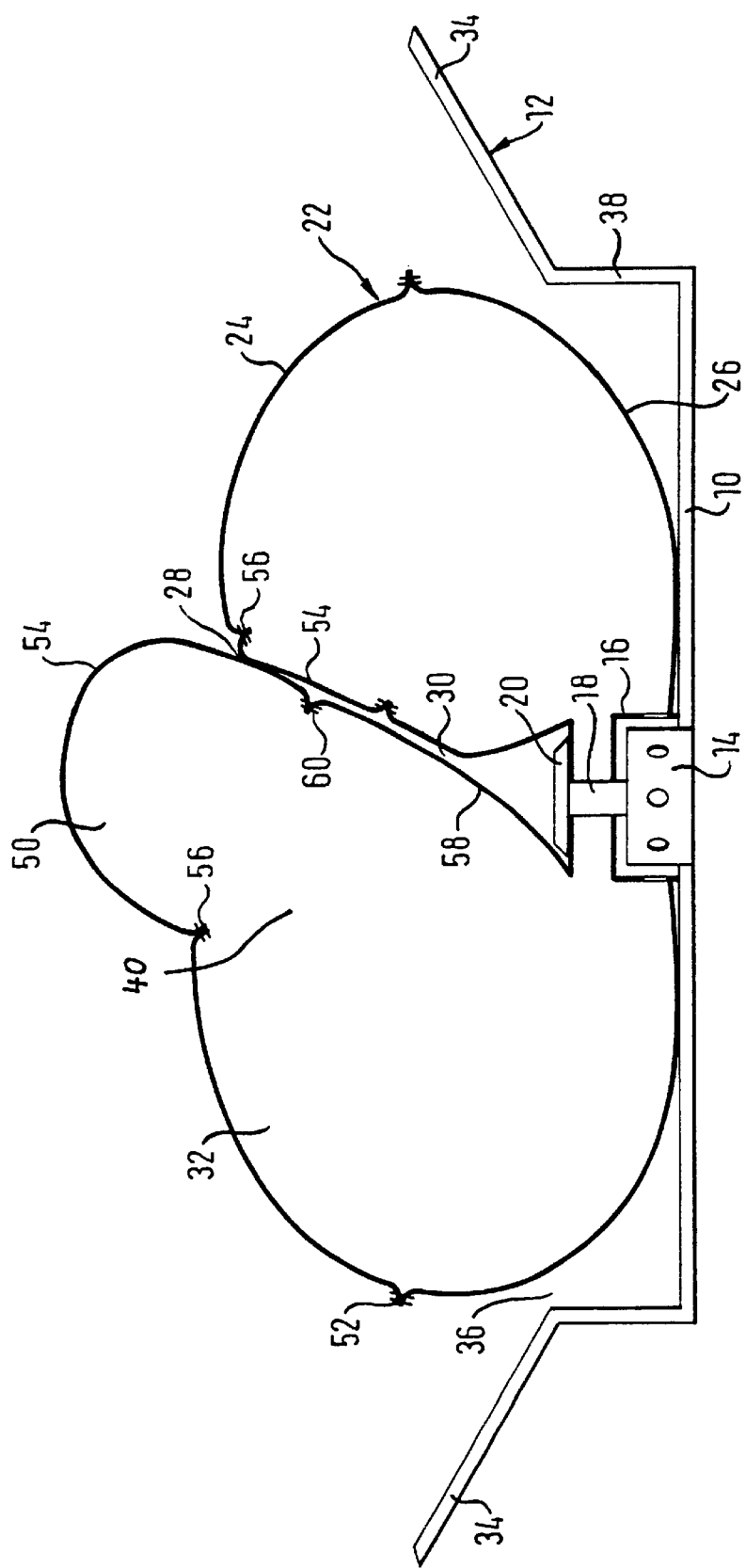
FIG. 1 shows a side view of the gas bag module according to the invention, with the gas bag inflated.

In FIG. 1 a gas bag module is illustrated, which is housed in the steering wheel of a vehicle. The gas bag module has a mounting housing 10 which is closed on the front face with a covering 12. In the module, a gas generator 14 is housed, which is surrounded by a cage-like diffusor 16. Projecting from the end face of the diffusor 16 is a holding piece in the form of a tube 18 which prevents a central piece 20 of the covering 12, in one piece, from swinging outwards on opening of the covering 12, so that the central piece 20 remains. A gas bag 22 in the module has a gas bag wall which consists of several sections, namely a front wall section 24 which faces the occupant in the inflated state, and a rear wall section 26. The front wall section 24 has a central opening which forms a mouth 28 of an indentation 30. The indentation 30 is produced in that through the holding piece 18 and the central piece 20, a part of the gas bag wall, namely the actual center of the front wall section 24, is prevented from moving towards the occupant. This center is that part of the gas bag wall that is located under the central piece 20 in FIG. 1 and forms the lowermost point of the indentation. Through the indentation 30, which is not filled with gas, an annular chamber 32 of the gas bag 22 is produced, which is to be filled with gas. As an alternative, the chamber 32 may also be divided into several chambers.

Reference numerals 34 designate the sections of the covering 12 which detach themselves from the central piece 20 on unfolding of the gas bag and swing outwards to free an annular outlet opening 36.

In the folded state, the gas bag is housed in the module in an annular space which is delimited radially by the diffusor 16, the holding piece 18 and externally by the peripheral wall 38 of the module housing 10.

So that the mouth 28 of the indentation 30 is closed as close as possible to the front wall piece 24, the gas bag has in the region of the mouth 28 a bubble-like inflatable extension 50 being in flow connection with the chamber 32 via an overflow opening 40, which extension 50 closes the indentation in the inflated state already at the mouth 28. The overflow opening 40 extends across the entire depth of the indentation 30, which is not necessarily so, however. The extension presses the entire indentation 30 obliquely outwards, in relation to FIG. 1 to the right, so that the indentation 30 extends from its lowest point beneath the central piece 20 obliquely towards the front wall section 24.

The inflatable extension 50 gives the entire gas bag a highly asymmetrical form and on inflation it pushes from one side radially against the mouth 28. In the inflated state, the extension 50 projects in addition beyond the front wall section 40. Within the indentation 30, the extension rests at least partially at the gas bag wall, in order to provide a support for the extension.

The gas bag 22 consists of four fabric layers which in the inflated, unfolded state lie one on the other and are connected with each other. The upper fabric layer forms the front wall section 24, the lower fabric layer forms the rear wall section 26, both being connected with each other along their outer periphery at a seam 52. The upper fabric layer is connected at the edge of its central opening with the edge of the opening of a first inner fabric piece 54 in the form of a ring along a seam 56. The outer edge of the fabric piece 54 is, in turn, sewn with a second inner fabric piece 58 along the closed peripheral seam 60, which second fabric piece forms the lower part of the indentation 30. The fabric pieces 54 and 58 form inner fabric pieces and together define the indentation and the extension 50.

Figure 2:
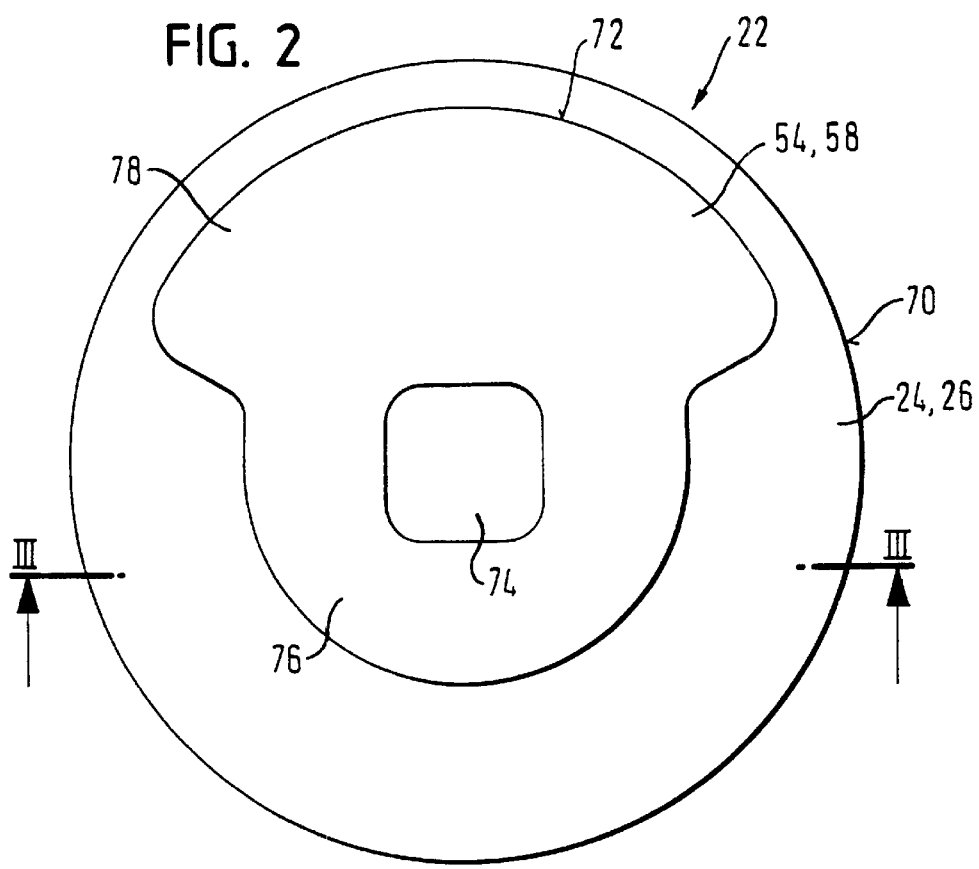
FIG. 2 shows a top view of the gas bag illustrated in FIG. 1 in the spread-out, non-inflated state.

In FIG. 2 the blank of the fabric pieces and also their position after being sewn together can be seen, all the outer edges of all fabric pieces having been projected into the plane of the drawing, for the purpose of illustration. The outer peripheral edge 70 is the peripheral edge that is common to the upper and lower fabric pieces, i.e. of the front and rear wall sections 24, 26. The inner fabric pieces 54, 58 have exactly the same external geometry with an outer edge 72. All the fabric pieces 24, 26, 54, 58 have a central opening 74, the individual openings being able to be of differing size. They are arranged concentrically to each other and in the unfolded, inflated state lie one over the other, as FIG. 2 shows.

The fabric piece 58 can also have several openings which do not have to lie centrally with respect to the openings of the remaining fabric pieces. If, for example, an emblem is fastened on the outer face of the central piece, screw bolts may project from the emblem on the rear face through the central piece and the fabric piece 58, so that the fastening of the emblem also serves for fastening the fabric piece 58. When the openings 74 of the fabric pieces 24, 26, 54, 58 do not lie one over the other, the fabric pieces must be moved to folds until they lie one over the other.

In order to form the extension 50, the inner fabric pieces 54, 58 have a circular ring section 76 which at a lateral end of the opening 74 continues into a bulge 78, which has the shape of a mushroom cap, and which in the inflated state defines the extension 50. The circular ring sections 76 delimit, on inflation, the movement of the wall section 24 towards the occupant.

Figure 3:
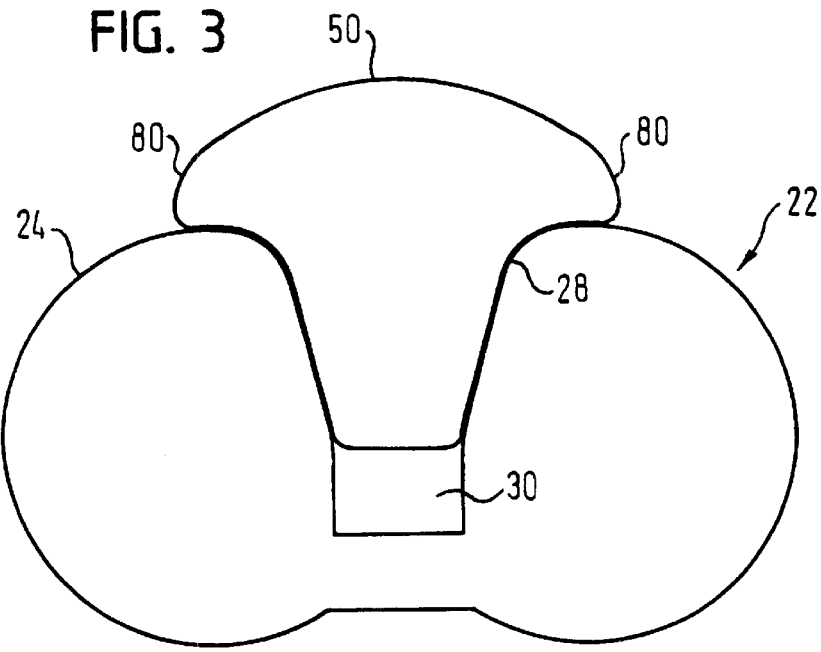
FIG. 3 shows a sectional view through the inflated gas bag along the line III—III in FIG. 2.

In FIG. 3 it can be seen that the extension 50 in the inflated state rests laterally at sections 80 even on the front wall section 24 and comes to lie on it, because it overlaps the wall section 24, in order to securely close the indentation 30 in the region of the mouth 28.

The embodiments according to FIGS. 4 to 6 correspond partly to the one describe above, so that parts and sections that are equivalent and have the same function are provided with the same reference numeral, and only the differences will be discussed hereinbelow.

Figure 4:
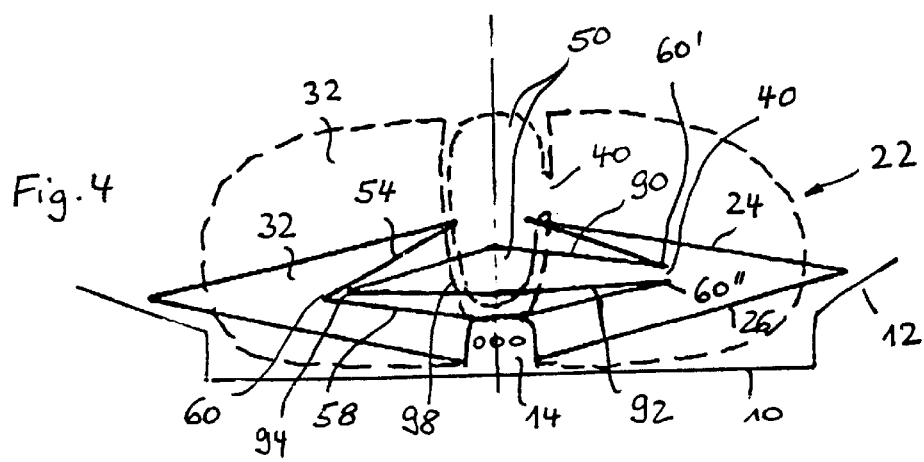
FIG. 4 shows a sectional view through a gas bag module according to the invention, in the spread-out state and with the fabric layers being slightly pulled apart.
Figure 5:
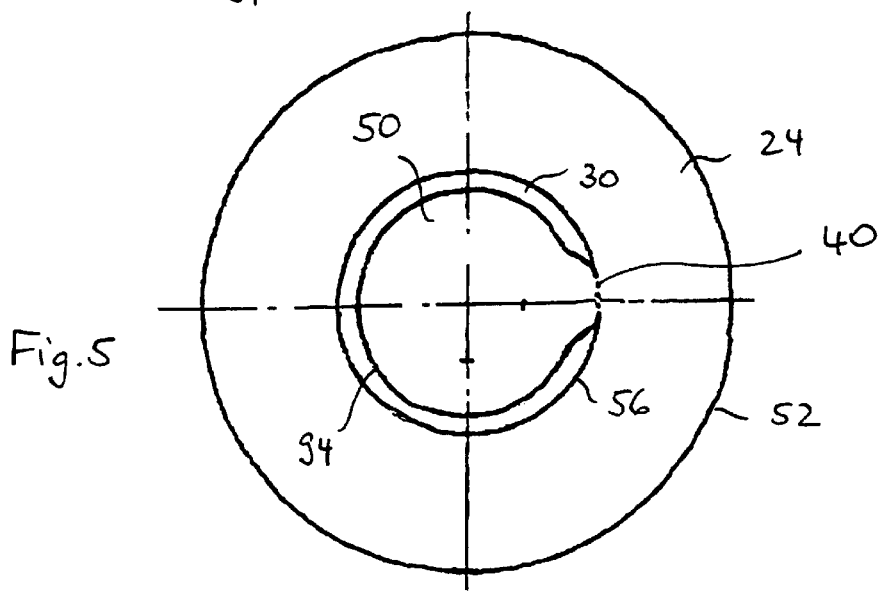
FIG. 5 shows a top view of the inflated gas bag of FIG. 4.

The gas bag 22 according to FIG. 4 has inner fabric pieces 54, 58, that are formed in the shape of a ring and that do not form the extension 50. Rather, the extension 50 is formed by two separate, preferably circular fabric layers 90, 92. Except of one or more places, the fabric layers 90, 92 are connected with each other at the peripheral edge 94. At that place where the fabric layers are not connected with each other, there is/are formed one or more overflow opening(s), so that a flow connection exists that leads to the chamber 32. For this, the seam 60 is omitted in the region of the overflow opening 40. The fabric layers 90 and 54 and layers 92 and 58, respectively, are connected with each other in the region of the overflow opening by means of seams or seam sections 60' and 60". Hence, the overflow opening 40 is situated approximately halfway up of the depth of the indentation 30, as regards the fully inflated state indicated in broken line. As is also shown in FIG. 5, the overflow opening 40 has a very small cross-sectional area, so that in the fully inflated state there may prevail a pressure in the extension 50 that is somewhat lower than the one in the chamber 32 (depending on the design). In the embodiment according to FIG. 4, the extension 50 has the shape of a separate, small gas bag filling the indentation 30. This separate, small gas bag is able to rest at obliquely and outwardly running sections 98 of the indentation 30, which thereby runs also obliquely outwards; to be more precise, it may rest at least in sections at the gas bag wall defining the indentation 30 and be supported preferably radially and/or axially by the chamber 32, at least during an occupant plunging in.

Figure 6:
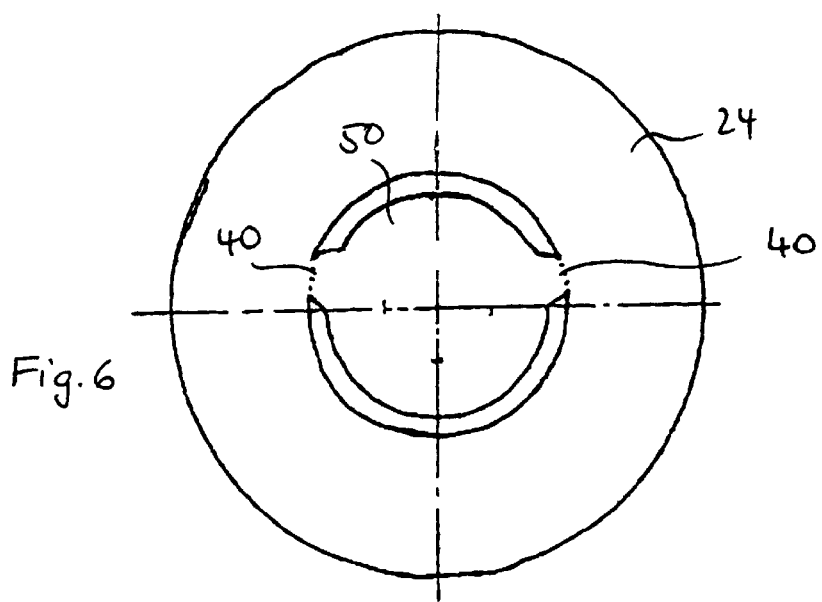
FIG. 6 shows a top view of a gas bag that is slightly modified with respect to the one shown in FIG. 4.

In FIG. 6 there is shown that two overflow openings 40 are provided.

In all embodiments, the entire gas bag in the folded state is to be configured so as to extend around the center piece 30, without directly resting on it from above.

What is claimed is:

1. A gas bag module comprising:
   a gas bag including a gas bag wall which has a front and a rear wall section and including at least one chamber,
   an indentation running from said front wall section in an inflated state in a direction toward said rear wall section, which indentation is formed in that a part of said gas bag wall is prevented from an unimpeded movement towards outside of said module on unfolding of said gas bag, said gas bag, in a region of a mouth of said indentation, having a bulbous inflatable extension in flow connection with said at least one chamber of said gas bag, which extension closes said indentation, said indentation running obliquely from a lowest point thereof toward said front wall section.

2. The gas bag module according to claim 1, wherein only one inflatable extension is provided, which is constructed such that on inflation it spreads radially inwards into said mouth.

3. The gas bag module according to claim 1, wherein in said inflated state of said gas bag, said extension rests at sections of said gas bag wall that define said indentation.

4. The gas bag module according to claim 1, wherein said extension in said inflated state of said gas bag projects outwards with respect to said front wall section.

5. The gas bag module according to claim 1, wherein as seen in a cross-section of said inflated gas bag, said extension has at least one passage opening to said chamber of said gas bag which passage opening defines a fluid communication between the extension and the chamber, said passage opening extending almost along the entire width of said indentation.

6. The gas bag module according to claim 1, wherein said inflatable extension is constituted by at least one separate fabric piece.

7. The gas bag module according to claim 1, wherein said extension, in said inflated state of said gas bag, overlaps said front wall section in part.

8. A gas bag module comprising:
a gas bag including a gas bag wall which has a front and a rear wall section and including at least one chamber,
an indentation running from said front wall section in an inflated state in a direction toward said rear wall section, which indentation is formed in that a part of said gas bag wall is prevented from an unimpeded movement towards outside of said module on unfolding of said gas bag,
said gas bag, in a region of a mouth of said indentation, having a bulbous inflatable extension in flow connection with said at least one chamber of said gas bag which extension closes said indentation, and
said extension in said inflated state of said gas bag projecting outwards with respect to said front wall section.

9. A gas bag module comprising:
a gas bag including a gas bag wall which has a front and a rear wall section and including at least one chamber,
an indentation running from said front wall section in an inflated state in a direction toward said rear wall section, which indentation is formed in that a part of said gas bag wall is prevented from an unimpeded movement towards outside of said module on unfolding of said gas bag,
said gas bag, in a region of a mouth of said indentation, having a bulbous inflatable extension in flow connection with said at least one chamber of said gas bag, which extension closes said indentation,
said inflatable extension is constituted by two superimposed fabric pieces that are connected with each other at outer edges thereof, and
said fabric pieces, for the purpose of forming passage openings to said chamber, being not connected with each other in at least one section of said outer edges.

10. The gas bag module according to claim 9, wherein as seen in a cross-section of said inflated gas bag, said extension has at least one passage opening which defines a fluid communication to said chamber of said gas bag, said passage opening being provided remote from said mouth of said indentation and approximately in the middle between said front and rear wall sections.

11. The gas bag module according to claim 9, wherein said gas bag, in relation to a spread-out, non-inflated state, consists of at least four fabric pieces lying one over the other and being connected with each other, including an upper and lower fabric piece to form said front and rear wall sections, respectively, and two inner fabric pieces which delimit said indentation.

12. The gas bag module according to claim 11, wherein at least some of said fabric pieces have a central opening, said openings being arranged concentrically to each other, in relation to said spread-out, non-inflated state of said gas bag.

13. The gas bag module according to claim 11, wherein said inner fabric pieces have an identical external geometry.

14. The gas bag module according to claim 11, wherein said inner fabric pieces have an asymmetrical, annular form with a bulge to form said extension.

15. The gas bag module according to claim 9, wherein said fabric pieces for the purpose of forming passage openings to said chamber are not connected with each other in at least one section of said edge.

16. The gas bag module according to claim 9, wherein said bulbous extension has the shape of a mushroom, the shape of the mushroom, seen in a sectional side view, having a stem portion extending within said indentation and a cap portion closing said indentation at said mouth.

17. A gas bag module comprising:
a gas bag including a gas bag wall which has a front and a rear wall section and including at least one chamber,
an indentation running from said front wall section in an inflated state in a direction toward said rear wall section, which indentation is formed by a part of said gas bag wall prevented from unimpeded movement towards outside of said module on unfolding of said gas bag,
said gas bag, in a region of a mouth of said indentation, having a non-symmetrical bulbous inflatable extension in flow connection with said at least one chamber of said gas bag, which extension closes said indentation,
said gas bag wall being defined by fabric pieces, at least one of said fabric pieces resulting in a non-symmetrical gas bag shape in the inflated state to form said bulbous inflatable extension.

18. The gas bag module according to claim 17, wherein a portion of said module overlies said part of said gas bag wall which forms said indentation to prevent said part of said gas bag wall from movement towards outside of said module on unfolding of said gas bag.

19. A gas bag module comprising:
a gas bag including a gas bag wall which has a front and a rear wall section and including at least one chamber,
an indentation running from said front wall section in an inflated state in a direction toward said rear wall section, which indentation is formed in that a part of said gas bag wall is prevented from an unimpeded movement towards outside of said module on unfolding of said gas bag,
said gas bag, in region of a mouth of said indentation, having a bulbous inflatable extension in flow connection with said at least one chamber of said gas bag, which extension closes said indentation, and
said extension, in said inflated state of said gas bag, overlaps said front wall section in part, and said bulbous extension having the shape of a mushroom, seen in a sectional side view, with a stem-shaped portion extending within said indentation and a cap with a convex outer side closing said indentation at said mouth of said indentation.

20. A gas bag module comprising:

a gas bag including a gas bag wall which has a front and a rear wall section and including at least one chamber, an indentation running from said front wall section in an inflated state in a direction toward said rear wall section, which indentation is formed in that a part of said gas bag wall is prevented from an unimpeded movement towards outside of said module on unfolding of said gas bag, said gas bag wall forming a bulbous extension defined by a separate gas bag wall portion and arranged within said indentation and closing said indentation, a gas bag wall portion defining said indentation circumscribing said separate gas bag wall portion defining said bulbous extension, and said extension being in flow connection with said at least one chamber of said gas bag.

21. The gas bag module according to claim 20, wherein as seen in a cross-section of said inflated gas bag, said extension has at least one passage opening which defines a fluid communication to said chamber of said gas bag, said passage opening being provided remote from said mouth of said indentation and approximately in the middle between said front and rear wall sections.

22. The gas bag module according to claim 20, wherein said gas bag, in relation to a spread-out, non-inflated state, consists of at least four fabric pieces lying one over the other and being connected with each other, including an upper and lower fabric piece to form said front and rear wall sections, respectively, and two inner fabric pieces which delimit said indentation.

23. The gas bag module according to claim 22, wherein at least some of said fabric pieces have a central opening, said openings being arranged concentrically to each other, in relation to said spread-out, non-inflated state of said gas bag.

24. The gas bag module according to claim 22, wherein said inner fabric pieces have an identical external geometry.

25. The gas bag module according to claim 22, wherein said inner fabric pieces having an asymmetrical, annular form with a bulge to form said extension.

26. The gas bag module according to claim 20, wherein fabric pieces forming said gas bag for the purpose of forming passage openings to said extension are not connected with each other in at least one section of fabric piece edges.

27. The gas bag module according to claim 20, wherein said bulbous extension has the shape of a mushroom, the shape of the mushroom, seen in a sectional side view, having a stem portion extending within said indentation and a cap portion closing said indentation.

* * * * *